(12) United States Patent
Wang et al.

(10) Patent No.: US 10,255,594 B2
(45) Date of Patent: Apr. 9, 2019

(54) SMART WEARABLE DEVICE AND CONTACTLESS PAYMENT METHOD

(71) Applicants: BOE Technology Group Co., Ltd., Beijing (CN); BEIJING BOE DISPLAY TECHNOLOGY CO., LTD., Beijing (CN)

(72) Inventors: Liyan Wang, Beijing (CN); Feng Bai, Beijing (CN); Miao Liu, Beijing (CN); Bin Zou, Beijing (CN); Hongna Ye, Beijing (CN); Haoyu Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/768,753

(22) PCT Filed: Apr. 14, 2015

(86) PCT No.: PCT/CN2015/076565
§ 371 (c)(1),
(2) Date: Aug. 18, 2015

(87) PCT Pub. No.: WO2016/090783
PCT Pub. Date: Jun. 16, 2016

(65) Prior Publication Data
US 2017/0270507 A1    Sep. 21, 2017

(30) Foreign Application Priority Data
Dec. 10, 2014 (CN) .......................... 2014 1 0759395

(51) Int. Cl.
*G06Q 20/32* (2012.01)
*G06Q 20/34* (2012.01)
*G06Q 20/22* (2012.01)

(52) U.S. Cl.
CPC ......... *G06Q 20/327* (2013.01); *G06Q 20/227* (2013.01); *G06Q 20/32* (2013.01); *G06Q 20/3278* (2013.01); *G06Q 20/34* (2013.01)

(58) Field of Classification Search
CPC .................................................. G06Q 20/32
(Continued)

(56) References Cited

U.S. PATENT DOCUMENTS 9,594,954 B1 *   3/2017   Walker ............... G06K 9/00469
2002/0147403 A1 * 10/2002   Ogura .................... A61B 5/022
600/500

(Continued)

FOREIGN PATENT DOCUMENTS

CN    103186945 A    7/2013
CN    203311163 U   11/2013
(Continued)

OTHER PUBLICATIONS

International Search Report and Written Opinion with English Language Translation, dated Jun. 30, 2015, Application No. PCT/CN2015/076565.
(Continued)

*Primary Examiner* — Robert R Niquette
*Assistant Examiner* — Liz P Nguyen
(74) *Attorney, Agent, or Firm* — Womble Bond Dickinson (US) LLP

(57) ABSTRACT

This disclosure relates to a smart wearable device and a contactless payment method, said smart wearable device comprising: an information storage unit, a control unit and a wireless communication unit, wherein, the information
(Continued)

storage unit is used for storing information of one or more bank cards; the control unit is used for identifying gathering means based on information of the gathering means received by the wireless communication unit, reading bank card information from the information storage unit, and controlling the wireless communication unit to transmit the read bank card information to the gathering means for payment. By means of the technical solution of this disclosure, contactless payment operation can be performed through the smart wearable device, so as to reduce personal effects carried by the user, increase life convenience of the user, and enhance user experience.

20 Claims, 2 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2003/0133515 A1* | 7/2003 | Kondo | G06F 1/1616 375/295 |
| 2010/0102123 A1 | 4/2010 | Skowronek | |
| 2012/0024947 A1 | 2/2012 | Naelon | |
| 2012/0030043 A1 | 2/2012 | Ross et al. | |
| 2013/0142016 A1 | 6/2013 | Pozzo et al. | |
| 2014/0058935 A1 | 2/2014 | Mijares | |

FOREIGN PATENT DOCUMENTS

| | | |
|---|---|---|
| CN | 103777550 A | 5/2014 |
| CN | 103870871 A | 6/2014 |
| CN | 103956006 A | 7/2014 |
| CN | 104042198 A | 9/2014 |
| CN | 104042199 A | 9/2014 |
| CN | 203825736 U | 9/2014 |
| CN | 104089862 A | 10/2014 |
| CN | 104392352 | 3/2015 |
| WO | 2012/014185 A1 | 2/2012 |
| WO | 2012/128824 A1 | 9/2012 |

OTHER PUBLICATIONS

Office Action in Chinese Application No. 201410759395.3 dated Apr. 20, 2017, with English translation.
Decision on Rejection in Chinese Application No. 201410759395.3 dated Aug. 30, 2017, with English translation.
Office Action in Chinese Application No. 201410759395.3 dated Feb. 20, 2017, with English translation. 9 pages.
Office Action in Chinese Application No. 201410759395.3 dated Jun. 7, 2017, with English translation.
International Preliminary Report on Patentability received for PCT Patent Application No. PCT/CN2015/076565, dated Jun. 22, 2017, 14 pages (9 pages of English Translation and 5 pages of Original Document).
European Search Report and Written Opinion received for EP Patent Application No. 15790432.7, dated May 4, 2018, 6 pages.
Anonymous, "Apple Watch—Wikipedia", Dec. 9, 2014, pp. 1-6, Availablle at <https://en.wikipedia.org/w/index.php?title=Apple_Watch&oldid=637391727>.

* cited by examiner

SMART WEARABLE DEVICE AND CONTACTLESS PAYMENT METHOD

FIELD OF THE INVENTION

This disclosure relates to the field of smart device technology, specifically, to a smart wearable device and a contactless payment method.

BACKGROUND OF THE INVENTION

The wearable smart electronic products have grown up gradually, have provided increasingly rich functions for people, and have changed the modern life style greatly. A smart wearable device is arranged with a smart operating system therein, and can be connected to the network, thereby being capable of implementing various functions, e.g. telephone, short message, email, photo, music etc. Smart wearable devices in the market currently have not been integrated with the contactless payment function yet.

SUMMARY OF THE INVENTION

The technical problem to be addressed by this disclosure is how to perform contactless payment through the smart wearable device, so as to provide convenience for user's daily life and enhance user experience.

For this purpose, this disclosure proposes a smart wearable device comprising: an information storage unit, a control unit and a wireless communication unit, wherein, the information storage unit is used for storing information of one or more bank cards; the control unit is used for identifying gathering means based on information of the gathering means received by the wireless communication unit, reading bank card information from the information storage unit, and controlling the wireless communication unit to transmit the read bank card information to the gathering means for payment.

According to an embodiment of this disclosure, the smart wearable device further comprises: a switch unit for controlling on and off of the wireless communication unit.

According to an embodiment of this disclosure, the information storage unit is a detachable memory card.

Optionally, the wireless communication unit is a near-field wireless communication chip integrated in the detachable memory card.

According to an embodiment of this disclosure, the smart wearable device further comprises: a display screen for displaying payment-related information.

Optionally, the display screen is a touch display screen, for adding, deleting and switching the bank card information stored on the information storage unit through touch operation.

Optionally, the smart wearable device further comprises: brightness adjusting means for adjusting display brightness of the display screen of the smart wearable device based on ambient light intensity.

Optionally, the smart wearable device further comprises: an ECG (electrocardiogram) pulse sensor for measuring a pulse velocity of a wearer and displaying the pulse velocity through the display screen.

Optionally, the smart wearable device further comprises: a PM2.5 sensor unit for detecting a concentration value of ambient PM2.5 and displaying the concentration value through the display screen.

According to an embodiment of this disclosure, the smart wearable device is a smart watch or a smart bracelet.

This disclosure further proposes a contactless payment method, comprising: receiving, by a smart wearable device, information of gathering means so as to identify the gathering means, wherein, the smart wearable device is arranged with a detachable memory card, and the detachable memory card stores information of one or more bank cards; reading by the smart wearable device bank card information in the detachable memory card, and transmitting the read bank card information to the gathering means for payment.

By means of said technical solutions, contactless payment operation can be performed through the smart wearable device, so as to reduce personal effects carried by the user, increase life convenience of the user, and enhance user experience. In addition, a photosensitive sensor can be further integrated to automatically control the brightness of the display screen with the ambient light intensity and facilitate the user to view the contents displayed on the screen, an ECG pulse sensor is integrated to detect the pulse of the wearer in real time so as to facilitate the user to monitor his own health conditions, and a PM2.5 sensor is integrated to detect the ambient PM2.5 value in real time so as to facilitate the user to monitor the ambient PM2.5 pollution in real time.

BRIEF DESCRIPTION OF DRAWINGS

The characteristics and advantages of this disclosure would be understood more clearly by making reference to the drawings, the drawings are schematic and should not be construed as any limitation to the present invention, in the drawings.

DETAILED DESCRIPTION OF THE INVENTION

In order to understand the above purposes, features and advantages of this disclosure more clearly, next, this disclosure will be described in more details with reference to the drawings and detailed description. It should be noted that in the case of not conflicting, the embodiments of the present application and the features in the embodiments can be combined with one another.

Many details are expounded in the following descriptions for the convenience of understanding this disclosure sufficiently, however, this disclosure can also be carried out using other modes different from those described here, hence, the protection scope of this disclosure is not limited by the following disclosed specific embodiments.

Figure 1:
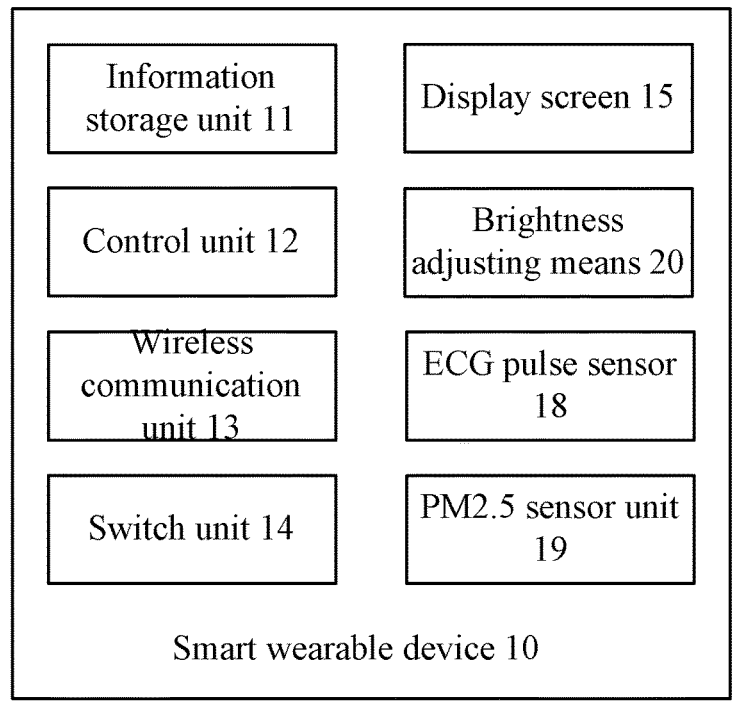
FIG. 1 shows a schematic block diagram of a smart wearable device according to an embodiment of this disclosure.

As shown in FIG. 1, a smart wearable device 10 according to an embodiment of this disclosure comprises: an information storage unit 11, a control unit 12, a wireless communication unit 13, wherein, the information storage unit 11 is used for storing information of one or more bank cards; the control unit 12 is used for identifying gathering means based on information of the gathering means received by the wireless communication unit 13, reading bank card information from the information storage unit 11, and controlling the wireless communication unit 13 to transmit the read bank card information to the gathering means for payment.

Performing contactless payment operation through the smart wearable device can reduce personal effects carried by the user, increases life convenience of the user, and enhances user experience. The stored information of the bank card includes various predefined information e.g. the card number, the issuing bank etc., the information of the bank card transmitted to the gathering means is the information of the bank card required by the payment and does not necessarily include all the stored information of the bank card.

Optionally, the smart wearable device further comprises: a switch unit 14 for controlling on and off of the wireless communication unit 13.

The switch unit can turn on the wireless communication unit when payment is required, and turn off the wireless communication unit when payment is not required, so as to avoid wiping a bank card by mistake and can save electric energy.

Optionally, the information storage unit 11 is a detachable memory card.

Optionally, the wireless communication unit 13 is a near-field wireless communication chip integrated in the detachable memory card.

A card slot can be arranged on the smart wearable device for accommodating the memory card, e.g., a SD card. The SD card provides storage space, and can integrate the near-field wireless communication chip of the external antenna. The SD card is powered by the smart wearable device, and the smart SD card identifies the gathering means after sensing the gathering means through the near-field wireless communication chip. After it is identified successfully, the register in the memory body of the memory card can be read and written via the ISO/IEC14443 protocol, thereby being capable of accomplishing the contactless payment operation. The Flash memory body of the SD card can store information of several bank cards, and can add or delete the bank cards, or switch a bank card to be a payment card through the APP of the smart wearable device. After the switching, the SD card keeps this bank card in the application state until switching again next time.

Optionally, the smart wearable device may further comprise: a display screen 15 for displaying payment-related information.

Optionally, the display screen 15 is a touch display screen for adding, deleting and switching the bank card information stored on the information storage unit 11 through touch operation.

Figure 2:
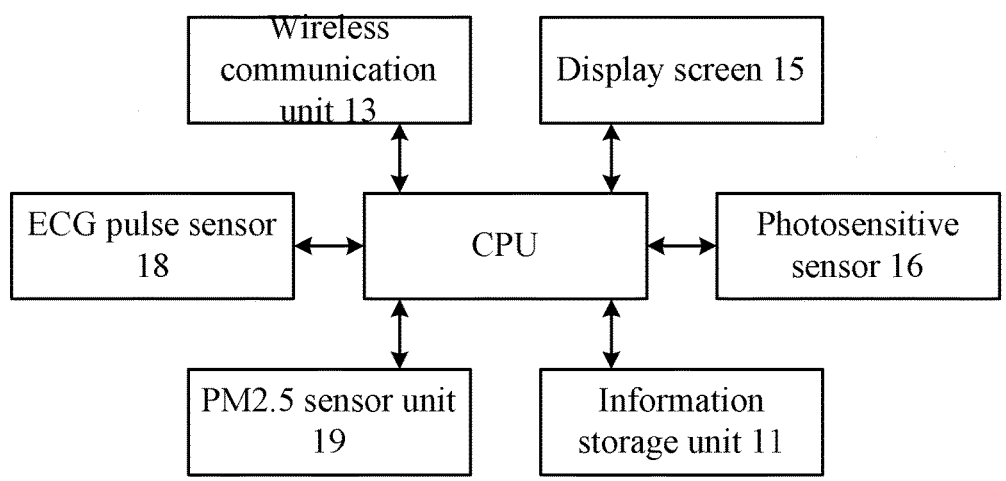
FIG. 2 shows a structural block diagram of a smart wearable device according to an embodiment of this disclosure.

As shown in FIG. 2, the above information storage unit, the wireless communication unit, the display screen, as well as the following photosensitive sensor, the ECG pulse sensor, the PM2.5 sensor unit can all be connected to a CPU for integrated data processing.

Optionally, the smart wearable device may further comprise: brightness is adjusting means 20 for adjusting display brightness of the display screen 15 based on ambient light intensity. Specifically, the brightness adjusting means 20 for example can comprise an optical sensor 15 and a brightness adjusting unit (not shown in the figure), the optical sensor 15 is used for sensing the ambient light intensity at a preset period and transmit it to the CPU. When the sensed light intensity in a period is smaller than the light intensity sensed in the previous period, the CPU will send an instruction for reducing brightness to the brightness adjusting unit. When the light intensity sensed in a period is larger than the light intensity sensed in the previous period, the CPU will send an instruction for increasing brightness to the brightness adjusting unit. When the brightness adjusting unit receives the instruction for reducing brightness, it reduces the display brightness of the display screen 15, and increases the display brightness of the display screen 15 when receiving the instruction for increasing brightness.

The photosensitive sensor is used for detecting the ambient light intensity around the smart wearable device, and the sensor outputs an analog voltage value capable of reflecting the ambient light intensity, which is transmitted to the CPU after being processed by the signal amplification circuit and the analog to digital conversion module. A register is arranged in the CPU for storing the digital signal, and the register is updated with the sampling interval of the sensor. The display screen lights up when it starts, the initial brightness and the initial light intensity of the display screen correspond to each other and are fixed. If the light intensity reflected by the next sampling voltage is higher than the light intensity reflected by the previous sampling voltage, the CPU will output a signal to the control chip of the driver boost circuit of the display screen, so as to increase the duty cycle of the switch MOS tube of the boost circuit, thereby realizing brightening of the screen. If the light intensity reflected by the next sampling voltage is lower than the light intensity reflected by the previous sampling voltage, the CPU will output a signal to the control chip of the driver boost circuit of the display screen, so as to reduce the duty cycle of the switch MOS tube of the boost circuit, thereby realizing dimming of the screen.

Optionally, the smart wearable device further comprises: an ECG pulse sensor 18 for measuring a pulse velocity of a wearer and displaying the pulse velocity through the display screen 15.

The ECG pulse sensor can make use of the light beam to measure the variation of the blood flow rate, and covert this optical signal into an electrical signal. This electrical signal is transmitted to the CPU via the amplification circuit and the analog to digital conversion module, the digital signal converted by the analog to digital conversion module is stored in a particular register, the CPU obtains the pulse velocity by looking up the table (the table contains the blood flow rate electrical signal and the pulse velocity in one-to-one correspondence). The pulse velocity is displayed on the display screen in e.g. digital form.

Optionally, the smart wearable device further comprises: a PM2.5 sensor unit 19 for detecting a concentration value of ambient PM2.5 and displaying the concentration value through the display screen 15.

The PM2.5 sensor can detect the concentration value of the ambient PM2.5. A shaping and amplifying circuit module is arranged between the PM2.5 sensor module and the CPU module, and the electrical signal of the PM2.5 concentration information collected by the PM2.5 sensor module is outputted to the CPU module after being amplified and shaped by the shaping and amplifying circuit module. The digital signal is stored in a particular register, the CPU obtains the PM2.5 concentration value by looking up the table (the table contains the PM2.5 concentration electrical signal and the PM2.5 concentration value in one-to-one correspondence). The PM2.5 concentration value is displayed on the display screen in e.g. digital form.

Optionally, the smart wearable device 10 is a smart watch or a smart bracelet. Indeed, here are only two examples, the smart wearable device 10 may also be wearable articles such as smart glasses, smart necklace.

The technical solution of this disclosure has been explained above in detail with reference to the drawings. By means of the technical solution of the present application, contactless payment operation can be performed through the smart wearable device, so as to reduce personal effects carried by the user, increase life convenience of the user, and enhance user experience.

It should be noted that the display device in this embodiment may be any product or component with the display function, such as electronic paper, a mobile phone, a tablet computer, a television, a laptop, a digital photo frame, a navigator.

Figure 3:
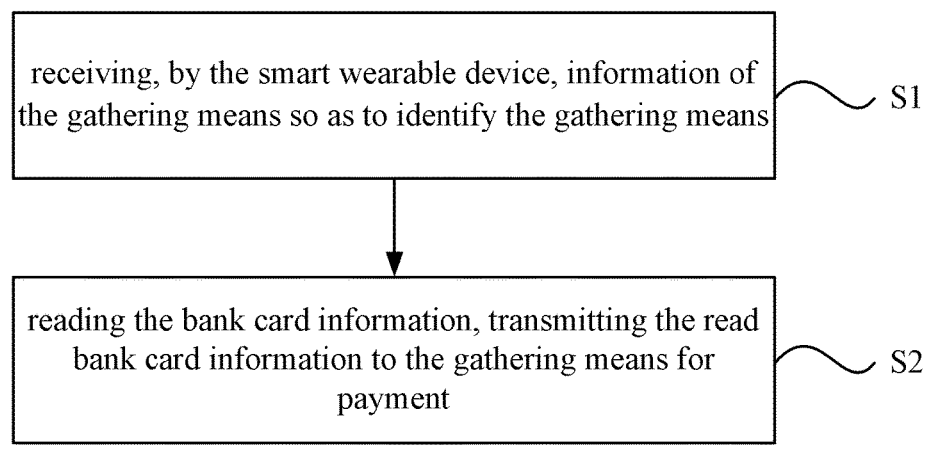
FIG. 3 shows a schematic flow chart of a contactless payment method according to an embodiment of this disclosure.

As shown in FIG. 3, the contactless payment method according to an embodiment of this disclosure comprises the steps of:

Step S1: receiving, by a smart wearable device, information of gathering means so as to identify the gathering means, wherein, the smart wearable device is arranged with a detachable memory card, and the detachable memory card stores information of one or more bank cards;

Step S2: reading by the smart wearable device bank card information in the detachable memory card, and transmitting the read bank card information to the gathering means for payment.

It should be pointed out that the respective devices and functions in this disclosure can be carried out through hardware, software, firmware or any combination of the three, which will not be repeated here. These all belong to the category of this disclosure.

In this disclosure, the term "a plurality of" refers to two or more than two, except for additional explicit definitions.

What are stated above are only optional examples of this disclosure, and are not used for limiting this disclosure. For the skilled person in the art, this disclosure may have various modifications and variations. Any modifications, equivalent replacements, improvements and the like made within the spirit and principle of this disclosure should all be covered within the protection scope of this disclosure.

The invention claimed is:

1. A smart wearable device comprising: an information storage unit, a control unit and a wireless communication unit, wherein,
    the information storage unit is configured to store information of one or more bank cards;
    the control unit is configured to identify a contactless payment receiver based on information of the contactless payment receiver received by the wireless communication unit, read bank card information from the information storage unit, and control the wireless communication unit to transmit the read bank card information to the contactless payment receiver for payment.

2. The smart wearable device according to claim 1, further comprising: a switch unit for controlling on and off of the wireless communication unit.

3. The smart wearable device according to claim 1, wherein the information storage unit is a detachable memory card.

4. The smart wearable device according to claim 3, wherein the wireless communication unit is a near-field wireless communication chip integrated in the detachable memory card.

5. The smart wearable device according to claim 1, further comprising:
    a display screen for displaying payment-related information.

6. The smart wearable device according to claim 5, wherein the display screen is a touch display screen, for adding, deleting and switching the bank card information stored on the information storage unit through touch operation.

7. The smart wearable device according to claim 1, further comprising:
    brightness adjusting means for adjusting display brightness of the display screen of the smart wearable device based on ambient light intensity.

8. The smart wearable device according to claim 1, further comprising: an ECG pulse sensor for measuring a pulse velocity of a wearer and displaying the pulse velocity through the display screen.

9. The smart wearable device according to claim 1, further comprising: a PM2.5 sensor unit for detecting a concentration value of ambient PM2.5 and displaying the concentration value through the display screen.

10. The smart wearable device according to claim 1, wherein the smart wearable device is a smart watch or a smart bracelet.

11. A contactless payment method, comprising:
    receiving, by a smart wearable device, information of a contactless payment receiver so as to identify the contactless payment receiver, wherein, the smart wearable device is arranged with a detachable memory card, and the detachable memory card stores information of one or more bank cards;
    reading, by the smart wearable device, bank card information in the detachable memory card; and transmitting the read bank card information to the contactless payment receiver for payment.

12. The contactless payment method according to claim 11, further comprising: receiving information of the contactless payment receiver by using a wireless communication unit.

13. The contactless payment method according to claim 12, further comprising: controlling on and off of the wireless communication unit through a switch unit.

14. The contactless payment method according to claim 12, wherein the wireless communication unit is a near-field wireless communication chip integrated in the detachable memory card.

15. The contactless payment method according to claim 11, further comprising: displaying payment-related information through a display screen.

16. The contactless payment method according to claim 15, wherein the display screen is a touch display screen, and the method further comprising: adding, deleting and switching the bank card information stored on the information storage unit through touch operation.

17. The contactless payment method according to claim 15, further comprising: adjusting display brightness of the display screen based on ambient light intensity by using brightness adjusting means.

18. The contactless payment method according to claim 15, further comprising: measuring a pulse velocity of a wearer by using an ECG pulse sensor and displaying the pulse velocity through the display screen.

19. The contactless payment method according to claim 15, further comprising: detecting a concentration value of ambient PM2.5 by using a PM2.5 sensor unit and displaying the concentration value through the display screen.

20. The contactless payment method according to claim 11, wherein the smart wearable device is a smart watch or a smart bracelet.

\* \* \* \* \*